United States Patent [19]

Kleeberg et al.

[11] 4,019,444
[45] Apr. 26, 1977

[54] METHOD OF AND APPARATUS FOR INCINERATING REFUSE

[75] Inventors: Ulrich Kleeberg, Mulheim (Ruhr); Jürgen Leimkühler, Essen; Johannes Kautz, Heiligenhaus, all of Germany

[73] Assignee: Gottfried Bischoff Bau Kompl., Essen, Germany

[22] Filed: Feb. 14, 1975

[21] Appl. No.: 550,013

[30] Foreign Application Priority Data

Feb. 21, 1974 Germany .......................... 2408223
Feb. 23, 1974 Germany .......................... 2408815

[52] U.S. Cl. ................................. 110/7 R; 23/262; 55/6; 55/84; 55/124; 55/226; 55/228; 261/DIG. 9; 423/240

[51] Int. Cl.² ........................................ F23B 1/00

[58] Field of Search ............ 55/84, 85, 89, 83, 226, 55/228, 6, 124; 261/17, DIG. 9; 423/240; 23/262, 277 C; 48/111, 209; 110/8 R, 7 R

[56] References Cited

UNITED STATES PATENTS

| 2,677,439 | 5/1954 | Hedberg | 55/85 X |
|---|---|---|---|
| 2,835,562 | 5/1958 | Boyer et al. | 55/85 X |
| 3,502,441 | 3/1970 | Hudson | 55/83 X |
| 3,518,812 | 7/1970 | Kolm | 55/89 X |
| 3,619,983 | 11/1971 | Rohr | 55/89 |
| 3,695,004 | 10/1972 | DeLisio et al. | 55/226 X |
| 3,726,065 | 4/1973 | Hausberg et al. | 55/226 X |
| 3,820,307 | 6/1974 | Hausberg et al. | 55/226 |

*Primary Examiner*—Frank W. Lutter
*Assistant Examiner*—William A. Cuchlinski, Jr.
*Attorney, Agent, or Firm*—Karl F. Ross; Herbert Dubno

[57] ABSTRACT

An incinerator gas is first passed through an evaporative cooler operating above the dew point of the gas and then the gas is passed through an electrostatic precipitator or cyclone which strips dry particles from the gas. Thereafter the gas passes through a scrubber operating with a scrubbing liquid so as to produce a solution that is fed to a clarifier. The decantate from the clarifier is recirculated as the scrubbing liquid whereas the sludge is neutralized and fed back into the evaporative cooler. Flash evaporation of this neutralized sludge in the cooler causes salt to crystalize so that these crystals can be stripped out at the downstream dry filter. A valve body at the outlet side of the scrubber is positioned in accordance with gas pressure inside the incinerator so as to maintain back pressure within the system substantially uniform.

8 Claims, 2 Drawing Figures

METHOD OF AND APPARATUS FOR INCINERATING REFUSE

FIELD OF THE INVENTION

The present invention relates to a method of and to an apparatus for incinerating refuse. More particularly this invention concerns such an apparatus for decontaminating incinerator gases so that they may be expelled into the atmosphere without air pollution.

BACKGROUND OF THE INVENTION

The hot gases issuing from an incinerator are typically cooled and scrubbed in a scrubbing tower. The solution produced in this tower as a result of the scrubbing liquid picking up impurities from the gas is clarified with the decantate being recycled for use as the scrubbing liquid and the sludge being disposed of.

Such a system has the considerable disadvantage that when a synthetic resin such as polyvinyl chloride is burned destructive elements or compounds, such as hydrochloric acid, are present in the incinerator gas. The recirculation of the scrubbing liquid after clarification by means of sedimentation or similar thickening is ineffective in such an arrangement in the long run, as it merely serves to concentrate the acidity of the scrubbing liquid. It is therefore impossible to dispose of this scrubbing liquid in a conventional manner due to its toxicity. Neutralization of the scrubbing liquid prior to disposal of it is similarly ineffective as the neutralizing agent only creates soluble neutralization products which are similarly highly polluting.

Another principal cause of the presence of noxious elements and substances in incinerator gas is inadequate combustion in the incinerator due to fluctuating gas pressure. As a rule a pump or blower is provided downstream of the incinerator in a conduit connected to this incinerator. The operation speed, and therefore the gas displacement or throughput of this blower, is varied in accordance with the type and quantity of the refuse being burned. This presents little difficulty, however other problems are created with this fluctuating pressure in the downstream scrubbing tower which is only efficient in a relatively limited pressure range. Thus the scrubbing tower will operate at a relatively low efficiency level occasionally, causing considerable pollution. This cannot be permitted so it is necessary carefully to control the type and quantity of garbage loaded into the incinerator so as not to exceed the operating range of the scrubbing tower.

OBJECTS OF THE INVENTION

It is therefore an object of the present invention to provide an improved method of and apparatus for incinerating refuse.

Another object is the provision of an improved method of and apparatus for decontaminating incinerator gas wherein the above-discussed problems of reusing the scrubbing liquid and disposing of the sludge formed by the clarification of the scrubbing liquid are eliminated.

Yet another object is the provision of an improved incinerator-gas treatment method and apparatus which allow the pressure in the incinerator to be maintained generally uniform without impairing the operating efficiency of the scrubbing tower.

SUMMARY OF THE INVENTION

These objects are attained according to the present invention in a method of purifying incinerator gas comprising the steps of evaporatively cooling gas with a cooling liquid, thereafter separating particles from the gas in a dry process, thereafter contacting the gas with the scrubbing liquid to scrub the gas and produce a suspension, clarifying the suspension to produce a decantate and a sludge, recirculating the decantate for use as a scrubbing liquid, neutralizing the sludge, and recirculating the neutralized sludge and using it as at least part of the cooling liquid in the evaporative-cooling step. Thus impurities in the gas are dissolved in the scrubbing liquid and separated out as crystals during the dry particle separation step. This is possible in accordance with the present invention by maintaining the gas above its dewpoint at least during the evaporative cooling and particle separation so that the recirculated neutralized sludge is flash evaporated and immediately forms dry crystals which are carried along with the gas and separated out at the separator, which may be of the cyclone or electrostatic-precipitator type.

According to another feature of this invention the gas pressure in the incinerator is detected and the flow cross section at the outlet side of the scrubbing tower is varied in accordance with the gas pressure in the incinerator to maintain pressure in the incinerator and in the scrubbing tower generally uniform. Thus in accordance with the present invention a fixed-speed or constant-displacement pump or blower is used to draw air and gas out of the incinerator, the back pressure being controlled by varying the flow cross section at the outlet side of the scrubbing chamber.

The system according to the present invention therefore comprises an evaporative cooler connected via a recirculating conduit and a neutralizer to the clarifier for the scrubbing liquid. Thus it is possible to convert any hydrochloric acid in the scrubbing liquid to, for example, sodium chloride which is removed from the system as crystals. This salt is readily disposable. It is also possible to use calcium oxide or carbonate as the neutralization agent, thereby producing calcium chloride which is recovered as crystals by the separator. This product indeed has its own value so that the relatively inexpensive lime or calcium carbonate is used to produce a byproduct of greater value.

This system is particularly effective because, according to the invention, the evaporative cooler is operated above the dew point of the incinerator gas. Thus when the still-liquid sludge is injected into the evaporative cooler it is flash evaporated, instantly forming dry crystals, with the latent heat of evaporation effective to cool the incinerator gas. The cooled but still unsaturated gas is subsequently passed through the electrostatic separator or cyclone and the crystals are separated out. The gas is only saturated eventually in the scrubbing tower downstream of the dry separator. In this scrubbing tower an extremely intensive and complete contacting of the incinerator gas with the scrubbing liquid is effected in order completely to remove the impurities therefrom.

In accordance with another feature of this invention there is provided in the scrubbing tower a restriction at the outlet side of the scrubbing tower in which there is in turn provided a valve body. Both the restriction and the valve body are tapered in the same direction and the valve body is displaceable within the restriction. A constant-displacement or fixed-speed pump has its input side connected to the output side of the scrubbing tower, and therefore serves to draw gas from the incinerator through the entire conduit of the purification system. The valve body is displaced by a servomotor in response to commands from a control system having a sensor in the incinerator which detects the pressure in the incinerator and adjusts the valve body accordingly. Thus with the system it is possible to operate the scrubbing tower at maximum efficiency with a fixed-speed blower. The pressure drop at the outlet side of the scrubbing tower determines the back pressure in the system, and, hence, pressure in the incinerator while at the same time the scrubbing tower can be operated well within its range of maximum efficiency. The invention may also be provided with an arrangement for removing crystals from the evaporative cooler. This is advantageous in that the flash evaporation frequently causes relatively large crystals to form which are too heavy to be carried along by the gas stream. These crystals drop and collect in the bottom of the cooler and may be removed periodically therefrom.

BRIEF DESCRIPTION OF THE DRAWING

The above and other objects, features, and advantages of the invention will become readily more apparent from the following description, reference being made to the accompanying drawing in which.

SPECIFIC DESCRIPTION

Figure 1:
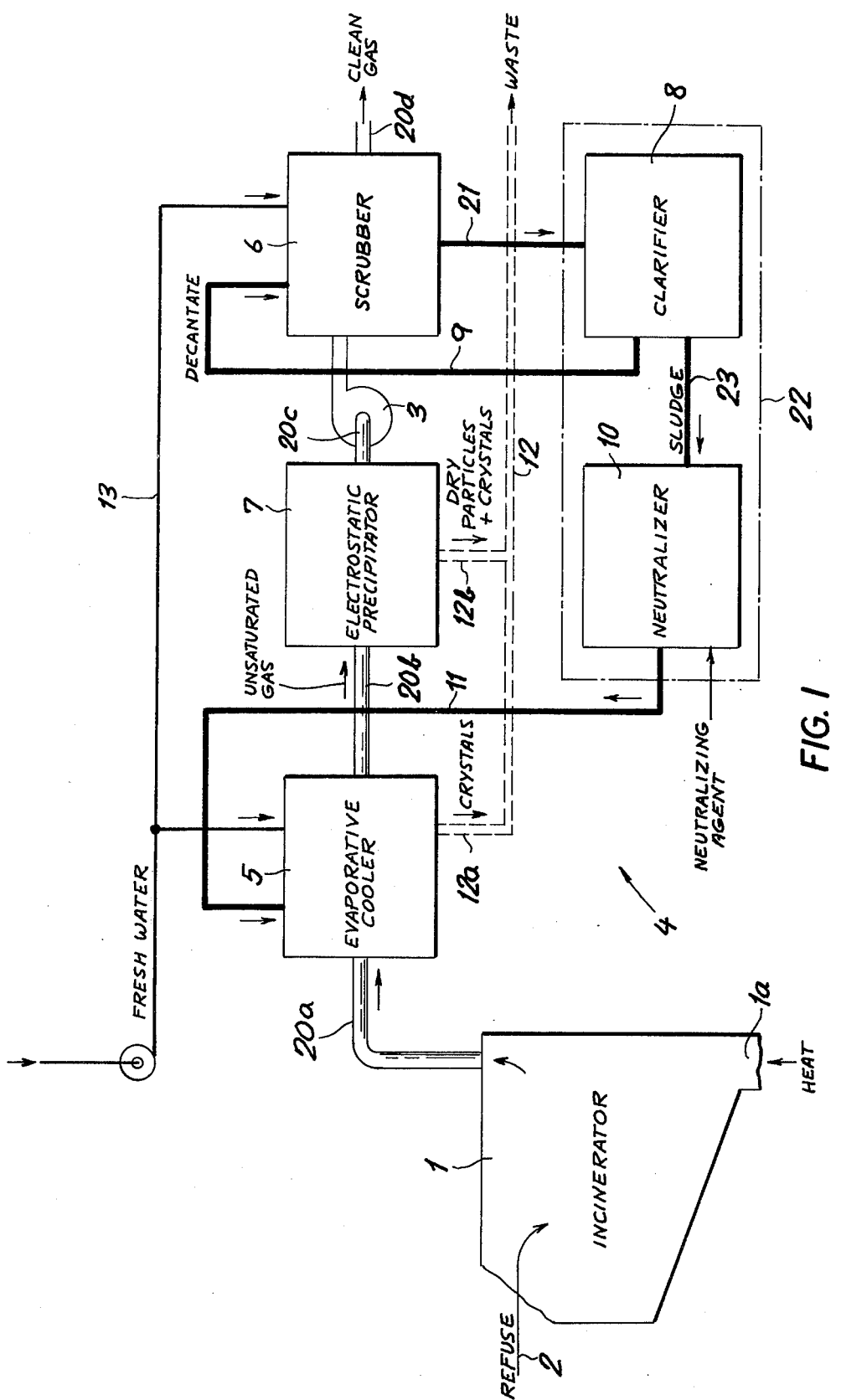
FIGS. 1 and 2 are diagrammatic views of systems according to the present invention.

As shown in FIG. 1 refuse is loaded as indicated by arrows 2 into an incinerator 1 having a lower inlet 1a and provided, if necessary, with a burner. Gases generated by the incineration exit from the incinerator 1 via a conduit section 20a to a gas-purification apparatus 2 having at its upstream end an evaporative cooler 5 substantially as described in pages 11–24 ff. of *Chemical Engineer's Handbook* edited by J. H. Perry (McGraw Hill: 1963). This evaporative cooler 5 is operated below the dewpoint of the gases issuing from the incinerator 1 so that unsaturated gas exits from the cooler 5 via a conduit section 20b and enters an electrostatic precipitator 7 as described on pages 21–69 ff. of the above-cited Handbook. In this precipitator 7 dry particles or crystals are separated from the gas and exit via a conduit inlet 12b of a waste conduit 12.

The downstream side of the precipitator 7 is connected via a conduit section 20c and axial-input radial output blower 3 to a scrubbing tower 6. In this tower 6 which is of the annular-gap type described below, the unsaturated gas is thoroughly contacted with a scrubbing liquid so that clean gas can issue from the outlet side of the scrubber 6 via a conduit section 20d.

There is produced in the scrubber 6 a scrubbing liquor which exits from the scrubber 6 via a pipe 21 and enters a clarifier 8 of a combined clarifier-neutralizer 22. In the clarifier 8 the denser fraction of the liquor sediments out as sludge and is fed by a pipe 23 to a neutralizer 10. The decantate is fed via a feedback pipe 9 to the top of the scrubber where it is employed as the scrubbing liquid.

In the neutralizer 10 the sludge, which contains hydrochloric acid is neutralized either by contact with an ion exchange resin, or addition thereto of a neutralizing agent such as calcium oxide, calcium carbonate, or lye. The neutralized sludge exits from the neutralizer 10 via a pipe 11 and is fed to the evaporative cooler where it is used at least in part as the cooling liquid.

Fresh water is supplied to the system via inlet lines 13 connected above to the evaporative cooler 5 and the scrubber 6. The fresh water input serves to compensate for losses from the system as a result of high humidification of the gas passing through conduit system 20a–d, as the gases exiting from the outlet conduit 20d are saturated. In addition the evaporative cooler 5 is provided with an outlet 12a connected to the outlet line 12 so that crystals may also be tapped off this cooler 5 if desired.

The system according to the present invention functions as follows:

Solid impurities, such as carbon particles, fly ash, and the like of the incinerator gas are removed by the electrostatic precipitator 7, and any particles which escape the precipitator 7 will be trapped in the scrubber 6.

Liquid and gaseous pollutants in the gas will pass through the cooler and the precipitator and be caught in the scrubber by the scrubbing liquid. The most noxious of pollutants which is trapped in this scrubbing liquid is chlorine usually in the form of hydrochloric acid. This hydrochloric acid is neutralized in the neutralizer 10 by means of lye or calcium carbonate or calcium oxide. The cell-neutralized sludge is then fed to the evaporative cooler 5 through the pipe 11 where it is flash evaporated so as to form salt crystals either of sodium chloride or calcium chloride. These crystals are dry and are carried by the moving gas into the electrostatic precipitator where they are drawn off at 12b. In this manner the relatively acid and potentially extremely dangerous solution exiting from the scrubber 621 is continuously neutralized so that it can be used for any of various industrial purposes or disposed of.

Figure 2:
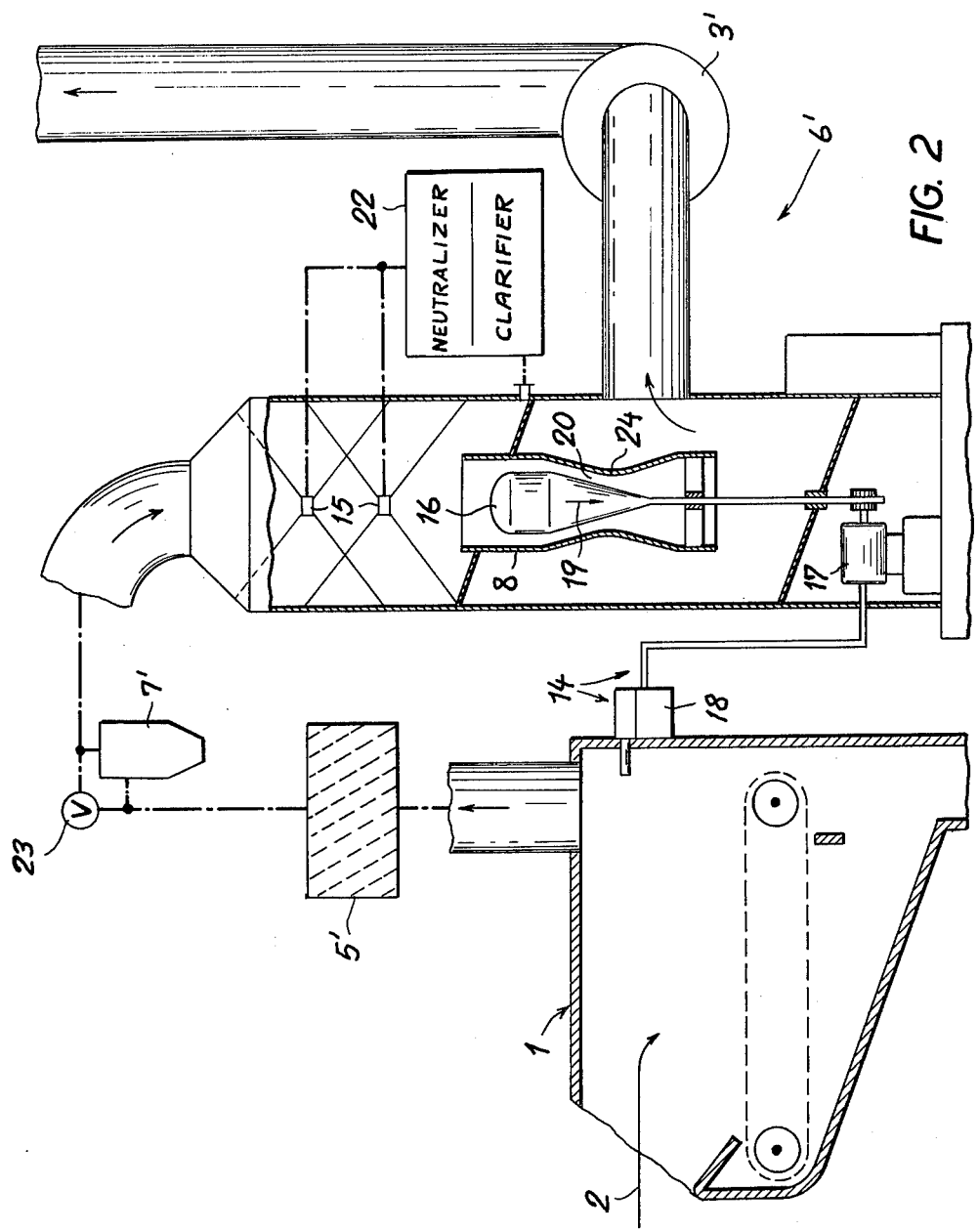

The arrangement shown in FIG. 2 is substantially identical to that shown in FIG. 1, with a cyclone 7' replacing the electrostatic precipitator 7 and an evaporative cooler 5' having inclined drip plates replacing the evaporator 5. In addition a shunt with a valve 23 is provided to allow the cyclone 7' to be bypassed if desired. Here the scrubbing tower 6 is replaced by a scrubbing tower 6' and a pump 3' is provided downstream of the scrubbing tower 6'.

The scrubber 6' has an upper washing arrangement with two spray heads 15 which inject the decantate from the combined neutralizer-clarifier 22 into the stream of air issuing from the incinerator 1. At the outlet side of this upper portion of the tower 6' there is provided a tubular outlet opening 8 having a narrow waist indicated at 24 of generally frustoconical shape and formed with a downwardly tapered valve body 16 and annular gap 20. A servomotor 17 is effective to raise and lower the body 16. A control arrangement 14 has a sensor 18 in the incinerator 1 which serves to detect pressure therein and to operate the servomotor 17. Thus if the pressure inside the incinerator drops below a certain level the motor 17 is operated to lower the body 16 in the direction of arrow 19 thereby decreasing the size of the annular gap 20.

Such an arrangement allows the back pressure in the system to be maintained relatively uniform. At the same time the arrangement 15 can operate at maximum efficiency. Obviously the pressure drop across the restriction of waist 24 causes the moisture in the saturated gas to condense and completely strip any impurities from the gas.

We claim:

1. A method of treating refuse comprising the steps of:
   incinerating refuse to produce a hot impurity-bearing gas;
   evaporatively cooling said gas with a cooling liquid which is flash evaporated;
   thereafter separating particles from said gas in a dry process;
   thereafter contacting said gas with a scrubbing liquid to scrub said gas and produce a scrubbing liquor;
   clarifying said liquor to produce a decantate and a sludge;
   recirculating said decantate for use as said scrubbing liquid;
   neutralizing said sludge;
   recirculating the neutralized sludge and using same as at least part of said cooling liquid, whereby impurities in said gas are dissolved in said scrubbing liquid and separated out as crystals during the dry-particle separation step;
   maintaining said gas above its dewpoint during evaporative cooling of said gas and particle separation therefrom;
   maintaining said gas under superatmospheric pressure during evaporative cooling thereof, particle separation therefrom, and scrubbing thereof, said gas being scrubbed in a tower, said gas being maintained under superatmospheric pressure by varying the flow cross-section for gas leaving said tower in accordance with incinerator pressure.

2. A method of treating refuse comprising the steps of:
   burning refuse in an incinerator to produce a hot gas;
   detecting gas pressure in said incinerator;
   passing said gas from an inlet side to an outlet side of a scrubbing chamber;
   scrubbing said gas in said chamber by contacting same with a scrubbing liquid;
   varying the flow cross section of said outlet side in accordance with gas pressure in said incinerator to maintain pressure in said chamber generally uniform;
   passing said gas through an evaporative cooler upstream of said scrubbing chamber and cooling said gas in said cooler with a cooling liquid;
   separating particles from said gas between said cooler and said scrubbing chamber in a dry-process separator, said scrubbing liquid forming a suspension with elements scrubbed out of said gas in said scrubbing chamber;
   clarifying said suspension to produce a decantate and a sludge;
   recirculating said decantate into said scrubbing chamber for use as said scrubbing liquid;
   neutralizing said sludge; and
   recirculating the neutralized sludge and using same as at least part of said cooling liquid, whereby elements in said gas are dissolved in said scrubbing liquid and separated out as crystals during the dry-particle separation step.

3. A system for treating refuse comprising:
   an incinerator for burning refuse and producing a hot gas;
   a conduit defining a flow path for said gas;
   means in said conduit for evaporatively cooling said gas with a cooling liquid;
   dry separator means downstream of the evaporative-cooler means in said conduit for separating particles from said gas in a dry process;
   scrubbing means downstream of said dry separator means in said conduit for contacting said gas with a scrubbing liquid for scrubbing said gas and producing a scrubbing liquor;
   clarifying means connected to said scrubbing means for reducing said liquor to a decantate and a sludge
   circulating means for recirculating said decantate between said clarifying means and said scrubbing means and thereby feeding said decantate into said scrubbing means as said scrubbing liquid;
   means connected to said clarifying means for neutralizing said sludge and forming salts therein; and
   means connected to the neutralizing means for feeding the neutralized sludge back to said evaporative-cooler means as at least part of said cooling liquid, said evaporative-cooler means producing crystals in said gas from the salts formed in said neutralizing means, said crystals being recovered from said gas by said dry separator means.

4. The system defined in claim 3 wherein said dry separator means is a cyclone.

5. The system defined in claim 3 wherein said dry separator means is an electrostatic precipitator.

6. The system defined in claim 3 wherein said scrubbing means comprises:
   a scrubbing tower having an inlet side connected to said conduit and an outlet side;
   means for forcing said gas through said tower from said inlet side to said outlet side;
   means in said tower for contacting said gas with said scrubbing liquid for removal of impurities therefrom;
   sensor means for detecting the gas pressure in said incinerator; and
   means connected to said sensor means for varying the flow cross-section of said outlet side of said tower in accordance with detected gas pressure in said incinerator for maintaining pressure in said incinerator generally uniform.

7. The system defined in claim 6 wherein said means for varying includes a tapering restriction in said tower at said outlet side and a correspondingly tapered displaceable valve body in said restriction defining an annular gap therewith.

8. The system defined in claim 6, further comprising a fixed-speed constant-displacement pump in said conduit downstream of said tower for drawing said gas through said conduit.

* * * * *